G. W. BINGHAM.
FILM FOR MOVING PICTURE MACHINES.
APPLICATION FILED OCT. 25, 1909.
1,045,502.  Patented Nov. 26, 1912.
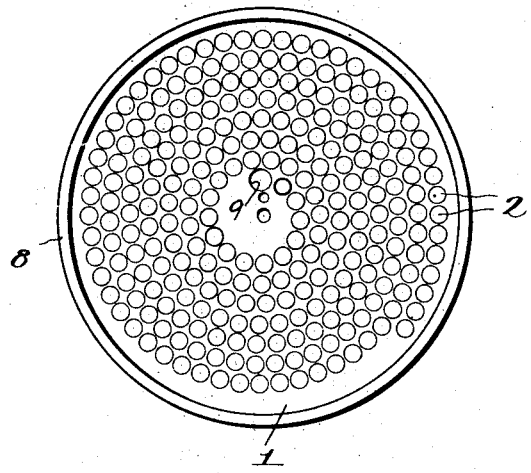
Witnesses:
Philip S. McLean
Teresa V. Lynch
Inventor:
George W. Bingham
by
Brock Beeken & Smith
Attys.

UNITED STATES PATENT OFFICE.

GEORGE W. BINGHAM, OF BROOKLYN, NEW YORK, ASSIGNOR TO BINGHAM-CAMERON COMPANY, A CORPORATION OF NEW YORK.

FILM FOR MOVING-PICTURE MACHINES.

1,045,502.   Specification of Letters Patent.   Patented Nov. 26, 1912.

Application filed October 25, 1909. Serial No. 524,365.

*To all whom it may concern:*

Be it known that I, GEORGE W. BINGHAM, a citizen of the United States, and a resident of the borough of Brooklyn, in the county of Kings and State of New York, have invented certain new and useful Improvements in Films for Moving-Picture Machines, of which the following is a specification.

My invention relates to improvements in films for moving picture machines.

The films in all moving picture machines of the present time, consist of a long strip upon which the pictures are placed in a single row. This strip of film is drawn through the machine and in the winding and rewinding thereof, it is subjected to a great deal of wear and tear. The film is also more or less bulky and unwieldy, it is liable to become torn and it is open to numerous other objections.

My invention has for its object, to overcome the various disadvantages which are incidental to the strip form of film.

My invention therefore consists broadly in placing the pictures upon the film in a series of rows arranged side by side. The film is then carried through the moving picture machine with an intermittent motion in such manner as to bring the individual pictures of the different rows, successively into alinement with the exposure opening of the machine. By "moving picture machine" I mean either the camera for taking the pictures, or the projecting apparatus for exhibiting the same. With the film in strip form, the pictures in the single row have to be individually printed one after another. This is an expensive and troublesome process.

Another object of my invention is to accomplish the printing of the pictures on the film, simultaneously.

The film may be either a flexible sensitized surface, or a plate of glass, celluloid or like material, and the term "film" will be understood to mean either the positive which is used with the projector, or the negative which is run through the camera. The same meaning attaches to the use of the word "pictures". On the positive, the picture will be actually apparent, while obviously, on the negative, the so-called pictures will consist merely of a continuous sensitized surface adapted to receive the impressions.

In the preferred form of the invention, the film is in the shape of a round plate or disk and the pictures are disposed spirally thereon, ranging progressively from the center to the rim of the disk.

Various other features of the invention will appear as the specification proceeds.

In the accompanying drawings there are illustrated several preferred forms of the invention, but various modifications and changes may be made therein without departing from the spirit and scope of the invention.

In the drawings is illustrated a plan or face view of the preferred form of the invention wherein the film is in the shape of a disk and the pictures are arranged in spiral rows thereon.

The film as shown preferably consists of a disk 1, of celluloid or like material which is provided with a sensitized surface to receive the impressions or pictures 2 on its face. The successive pictures are arranged in rows, as shown, and these rows are disposed in spiral relation, ranging from the center to the periphery of the disk, as illustrated.

An intermittent shifting motion is imparted to the film by any suitable mechanism (such as that shown in my Patent No. 971,588 granted Oct. 4, 1910) so as to bring the pictures successively into alinement with the exposure opening of the machine, and a certain lateral shifting motion must also be given to the film so as to bring the different rows into register with the opening. The film shown in the drawing is given an intermittent spiral movement to bring the pictures successively into alinement with the exposure opening. The series of pictures may start either at the center or at the edge of the disk, and the direction of movement would of course correspond.

The pictures may be placed very close together on the film so that the film while compact in size has a comparatively great capacity for exhibition purposes. Furthermore, by arranging the pictures in rows on the same film, I am enabled to print all the pictures at the same time, with the same ease and facility as in printing a single picture.

In order to protect the edge of the film from injury, I may apply a binding strip 8 to the edge thereof. This binding strip may be of metal, such as aluminum, or it may be a fabric of some sort. This binding strip lends a certain rigidity to the film itself, thereby permitting the film to be made of a comparatively light and thin material.

The light and heat generated by the projecting apparatus is very intense and in some cases it is sufficiently strong to set fire to the film if the film is allowed to remain stationary in the projector for any length of time when the light is on. In order to obviate any danger of this sort, I prefer to provide the film with one or more openings 9, sufficiently large to permit unobstructed passage of the light rays therethrough. One of these openings would preferably be placed just preceding the first of the series of the pictures on the film and if found desirable, a light opening could be placed at the end of the series, or at points intermediate. The film may thus be placed in the projector and allowed to remain there, with the light turned on, until ready for use. The light opening at the beginning of the pictures is also of assistance in initially positioning the film with respect to the exposure opening of the machine.

I claim:

1. A film for moving picture machines comprising a sheet of celluloid or like material provided with a series of progressively disposed pictures thereon, there being provided an opening in the sheet of material preceding the first of the series of pictures and said opening being of a size as large or larger than the pictures so as to permit the free passage of the beam of light emanating from the projection apparatus of the machine.

2. A film for moving picture machines comprising a disk of celluloid or like transparent material provided with a series of pictures arranged progressively thereon, said disk having an opening therein located in advance of the series of pictures and said opening being large enough to permit free passage of the beam of light emanating from the projection apparatus of the machine.

Signed at New York in the county of New York and State of New York this 22nd day of October A. D. 1909.

GEORGE W. BINGHAM.

Witnesses:
    PHILIP S. MCLEAN,
    TERESA V. LYNCH.